L. J. BALDWIN.
TONGS FOR COAL, &c.

No. 172,906.  Patented Feb. 1, 1876.

WITNESSES  
C. F. France  
M. O. Waggoner

INVENTOR  
Lauren J. Baldwin.

UNITED STATES PATENT OFFICE.

LAURIN J. BALDWIN, OF WESTON, OHIO.

IMPROVEMENT IN TONGS FOR COAL, &c.

Specification forming part of Letters Patent No. 172,906, dated February 1, 1876; application filed August 4, 1875.

*To all whom it may concern:*

Be it known that I, LAURIN J. BALDWIN, of Weston, Wood county, Ohio, have invented a new and useful Device for Handling and Carrying Coals, Ice, Ashes, Dust, &c., of which the following is a specification:

It is the object of my invention to provide a simple device for uniting a couple of shovels or scoops at the upper or outer ends of the handles thereof by a detachable joint, in such a manner as to hold the edges of such shovels or scoops together with their concave sides or surfaces facing or toward each other, thereby forming a close chamber or receptacle in which coals, ashes, dust, &c., may be carried without danger of scattering or dropping the same; the whole so constructed that said shovels or scoops can be readily attached and detached from each other, and when united move freely upon said joint, thereby forming a pair of tongs, for picking up and handling coals, ice, &c.

Figure 1:
Figure 2:
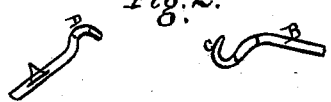
Figure 3:
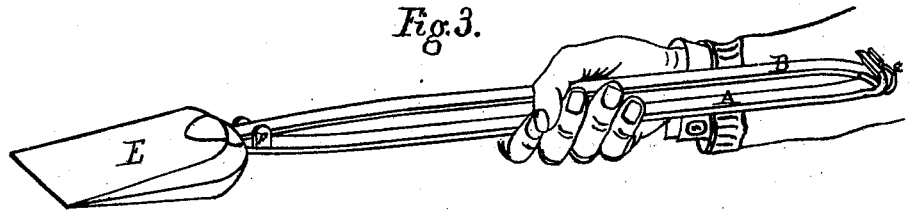

Figure 1 in the accompanying drawings shows the plan of my invention; Fig. 2 shows a side view of the same; Fig. shows my invention as in use.

A and B in the accompanying drawings represent the upper or outer ends of the handles of the shovels or scoops.

The handle A at the end is slightly bent or curved toward the upper or concave side of the shovel or scoop, and at the point D is pierced with two or more holes or openings.

The handle B, at the upper or outer end thereof, is slightly bent or curved toward the concave side of the shovel or scoop, and is divided into two or more hooks, C, each of which is bent toward the convex side or face of the shovel or scoop, the curvature of the handles A and B and of the hooks C, being so adjusted to each other that when the hooks C are placed through the holes D the shovels or scoops move freely upon the joint thus made, and when the two handles are so opened as to form one straight line, the hooks C are easily attached or detached from the holes D.

Upon opposite sides of the handle A, at or near the point where it is joined to the shovel or scoop, are the projections F, so arranged that when the shovels or scoops are closed the handle B is held by said projections from moving or slipping toward either side, thereby holding the edges of the shovels or scoops firmly together.

I claim as my invention—

The combination of the hooks C and the holes D, uniting the handles A and B, substantially as and for the purposes hereinbefore set forth.

In testimony whereof I have hereunto subscribed my name.

LAURIN J. BALDWIN.

Witnesses:
J. W. CLAYTON,
WM. E. HARPER.